US008639836B2

(12) United States Patent
Accapadi et al.

(10) Patent No.: US 8,639,836 B2
(45) Date of Patent: Jan. 28, 2014

(54) SMART NAGLING IN A TCP CONNECTION

(75) Inventors: Jos Manuel Accapadi, Austin, TX (US); Kavitha Vittal Murthy Baratakke, Austin, TX (US); Nikhil Hegde, Round Rock, TX (US); Rashmi Narasimhan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 12/494,029

(22) Filed: Jun. 29, 2009

(65) Prior Publication Data

US 2010/0332678 A1 Dec. 30, 2010

(51) Int. Cl.
*G06F 15/16* (2006.01)

(52) U.S. Cl.
USPC .......................................................... 709/235

(58) Field of Classification Search
USPC ................. 709/235, 232–233, 230–231, 234; 370/464–475
See application file for complete search history.

(56) References Cited

U.S. PATENT DOCUMENTS

| 6,115,357 | A * | 9/2000 | Packer et al. ................. 370/231 |
| 6,327,626 | B1 | 12/2001 | Schroeder et al. ............ 709/236 |
| 7,349,977 | B2 * | 3/2008 | Brown et al. ................. 709/235 |
| 7,623,546 | B1 * | 11/2009 | Bashyam et al. ............. 370/465 |
| 7,652,595 | B2 * | 1/2010 | Niemi et al. ..................... 341/67 |
| 2005/0265235 | A1 * | 12/2005 | Accapadi et al. ............ 370/235 |
| 2006/0133422 | A1 * | 6/2006 | Maughan et al. ............ 370/474 |
| 2006/0168176 | A1 | 7/2006 | Arora et al. ................... 709/223 |
| 2007/0266233 | A1 | 11/2007 | Jethanandani et al. ....... 713/153 |

OTHER PUBLICATIONS

J. Postel, RFC 879—TCP maximum segment size and related topics, Nov. 1983, Network Working Group, pp. 1-12.*
Moldeldev, K.; Gunningberg, P.; "How a large ATM MTU causes deadlocks in TCP data transfers" Networking, IEEE/ACM Transactions on vol. 3, Issue 4, Aug. 1995 pp. 409-422.

* cited by examiner

*Primary Examiner* — Chirag R Patel
(74) *Attorney, Agent, or Firm* — VanLeeuwen & VanLeeuwen; John D. Flynn

(57) ABSTRACT

An approach is provided to improve network efficiency. A send segment size, such as a maximum segment size (MSS), that corresponds to data segments being sent to a receiver over a computer network. A data block is identified in a send buffer and the data block includes more than one data segments. Based on the determined send segment size, all but a remaining data segment of the data segments are sent to the receiver. The sent data segments are each the determined send segment size and the remaining data segment is smaller than the send segment size. The remaining data segment is sent to the receiver in response to identifying that the remaining data segment is a portion of the data block.

17 Claims, 5 Drawing Sheets

SMART NAGLING IN A TCP CONNECTION

TECHNICAL FIELD

The present invention relates to increasing efficiency in computer networks by reducing network congestion. More particularly, the present invention relates to identifying the data segments belonging to a larger data block to avoid delaying delivery of the data segments.

BACKGROUND OF THE INVENTION

Congestion in computer networks slows network traffic. To reduce congestion, network devices automatically concatenate small messages to create larger blocks of data to send to the receiver. These congestion algorithms wait until a determined amount of data (e.g., a Maximum Segment Size (MSS), etc.), is available to send or until all acknowledgements have been received before sending the receiver more data. While these congestion algorithms are advantageous in delivering small messages, they are challenged when delivering larger data blocks, such as a large multimedia file, that might be split over several send operations.

SUMMARY

An approach is provided to improve network efficiency. A send segment size, such as a maximum segment size (MSS), that corresponds to data segments being sent to a receiver over a computer network. A data block is identified in a send buffer and the data block includes more than one data segments. Based on the determined send segment size, all but a remaining data segment of the data segments are sent to the receiver. The sent data segments are each the determined send segment size and the remaining data segment is smaller than the send segment size. The remaining data segment is sent to the receiver in response to identifying that the remaining data segment is a portion of the data block.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
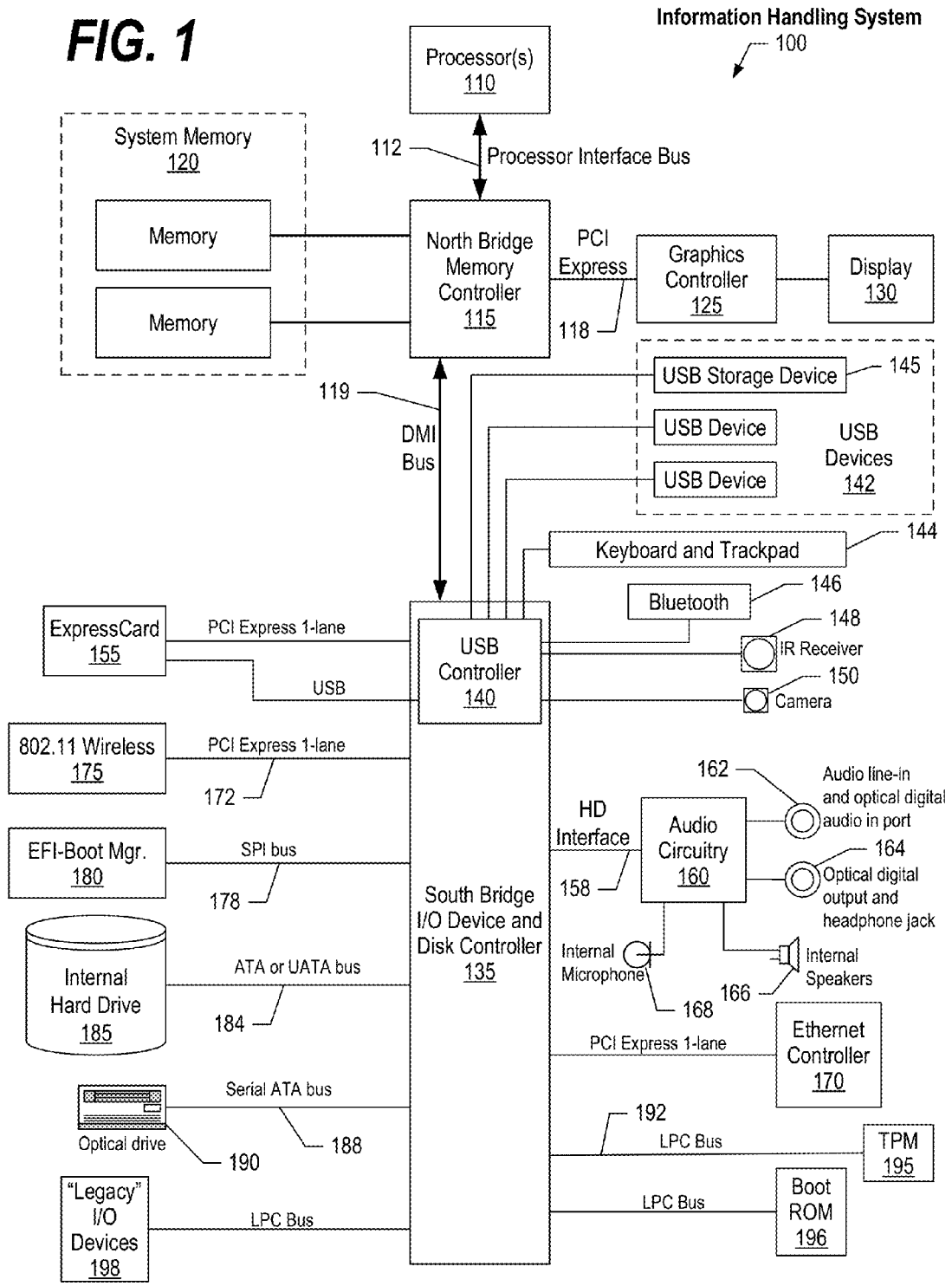
FIG. 1 is a block diagram of a data processing system in which the methods described herein can be implemented.
Figure 2:
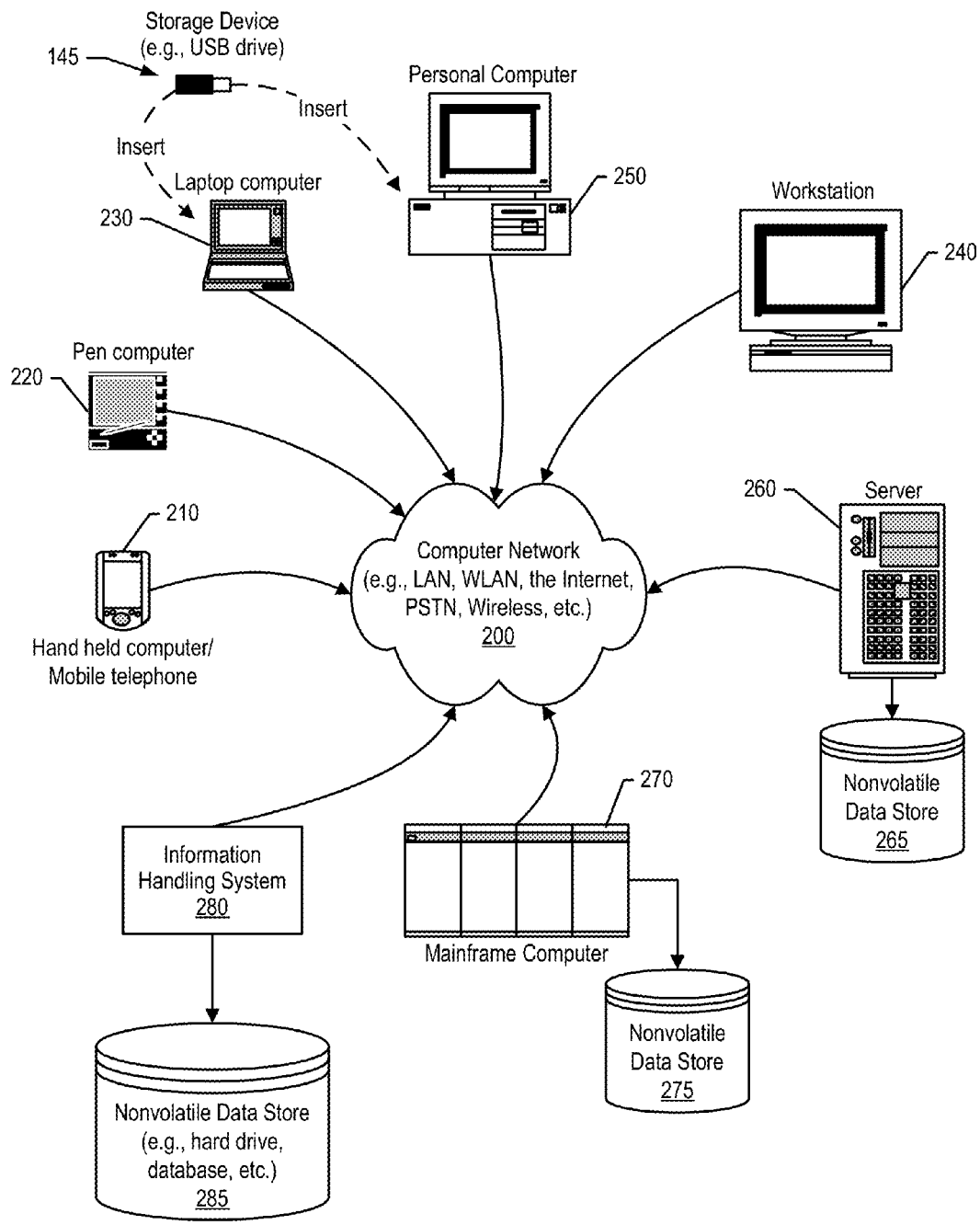
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interlace (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface; such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
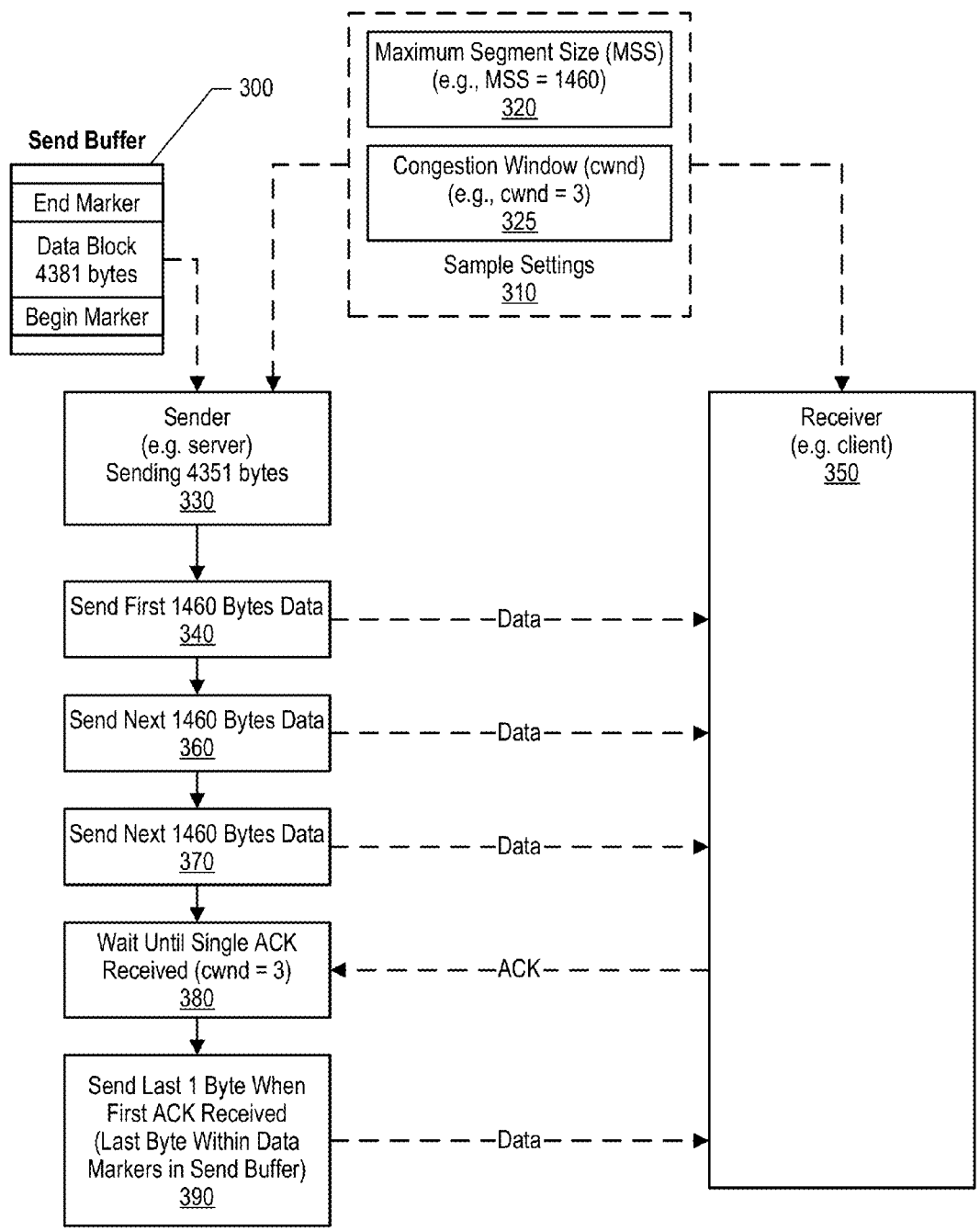
FIG. 3 is a an overview diagram showing markers being used in a send buffer to identify blocks of data.

FIG. 3 is a an overview diagram showing markers being used in a send buffer to identify blocks of data. Furthermore, FIG. 3 provides an example of sending a larger data block and reducing network delay while still managing network congestion. Send buffer 300 is a memory area where data to be sent from the sender 330 to receiver 350 is stored on the sender's computer system while waiting to be sent to the receiver. To illustrate an example, sample settings 310 are shown being used by both the sender and the receiver. Sample settings 310 include send segment size 320, such as a Maximum Segment Size (MSS) that indicates the largest data segment that will be sent between sender 330 and receiver 350. In addition, sample settings 310 include congestion window (cwnd) setting 325 which indicates the number of outstanding acknowledgments that are allowed. In the example shown, the determined send segment size is 1460 bytes and the congestion window is set at 3. Using these settings, if there are 3 unacknowledged data segments, then sender 330 will refrain from sending further data segments until some of the acknowledgements are received from receiver 350. In addition, with the determined send segment size set at 1460, the sender will try to gather 1460 bytes in a single segment. The segment can include data from multiple data blocks that have been written to send buffer 300. For simplification, send buffer 300 is shown with a single data block that is 4381 bytes in size. Dividing the 4381 bytes of the data block by the 1460 determined send segment size reveals that the data block needs to be sent in three full sized segments of 1460 each and a last small segment of 1 byte (1460+1460+1460+1=4381).

At step 340, the sender sends the first segment of 1460 bytes to receiver 350, and at steps 360 and 370 the second and third full sized segments of 1460 bytes are sent to receiver 350. In the example, because the congestion window is set at 3, the sender waits until at least one acknowledgement is received before sending the remaining 1 byte of data. At step 380, the receiver waits until a single acknowledgement is received from the receiver. Now, using standard Nagling algorithms, the sender would wait until either (1) all of the acknowledgements had been received from the receiver, or (2) new data arrived at the send buffer so that at least the determined send segment size (e.g., 1460 bytes in our example) could be sent. This would cause unnecessary delays, especially when the receiver is waiting for a single byte of data to complete the data block (e.g., a multimedia file, etc.). This problem is exacerbated when the sender is a file server that provides files to the receiver so that the aforementioned scenario occurs repeatedly. Using the approach described herein, the data block is identified as such so that the last remaining bytes of data can be identified as being a portion of the larger data block. When this identification is made, at step 390, the remaining data segment (e.g., the last 1 byte in our example) is sent to the receiver as soon as the congestion window is satisfied, rather than waiting until all the acknowledgements have been received or until additional data is received in the send buffer to send to the receiver. In one embodiment, as shown, the data block is identified by writing a pair of data markers to the send buffer, one before the start of the data block and one at the end of the data block. In this fashion, the sending process can identify data segments within the data block as being a portion of the larger data block.

Using our example, if additional data (e.g., a subsequent data block) arrives at the send buffer before the last remaining data segment from the first data block is sent, then data from the subsequent data block can be added to the remaining data segment from the first data block and sent as one data block. However, since the process sends the remaining data segment because it is part of a larger data block with portions that have already been sent (e.g., the first three segments in the example that were sent at steps 340, 260, and 370), the process does not wait for the send buffer to reach the maximum segment size nor does the process wait for all outstanding acknowledgements to be received before sending the last remaining data segment along with the subsequent data block. Instead, once the congestion window is satisfied, the data in the send buffer (up to the maximum segment size) is sent to the receiver.

The subsequent data block is also identified as being a data block separate from the first data block. Assuming that after the last remaining data segment from the first data block has been sent and a subsequent-data block is received that is not greater than or equal to the maximum segment size (e.g., a small data block), then a standard Nagling algorithm can still be used and delay sending the small data block until either (1) all the acknowledgements have been received or (2) one or more additional data blocks are received in the send buffer so that the send buffer is greater than or equal to the determined send segment size (e.g., 1460 bytes in our example).

Figure 4:
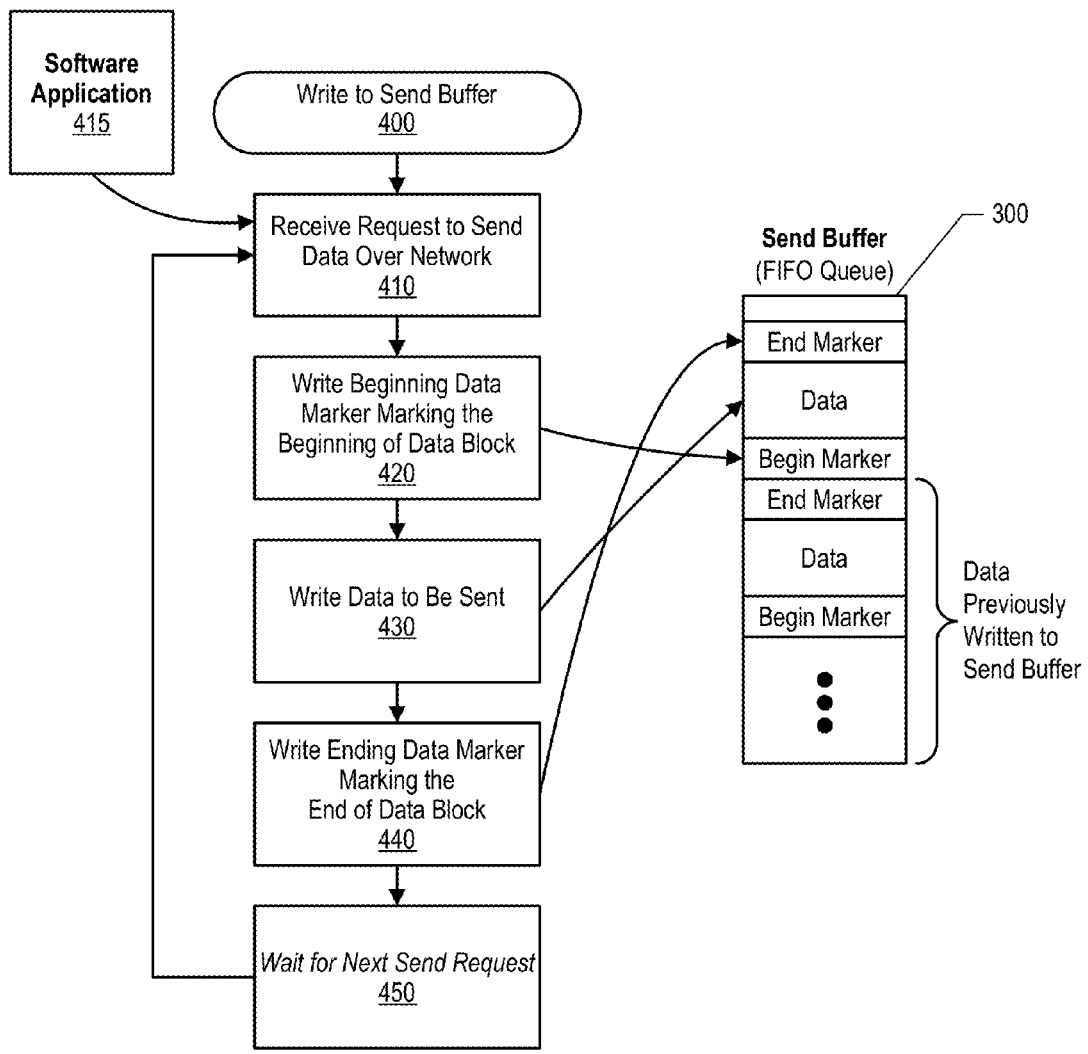
FIG. 4 is a flowchart data being written to the send buffer and markers being inserted before and after the blocks of data written to the send buffer.
Figure 5:
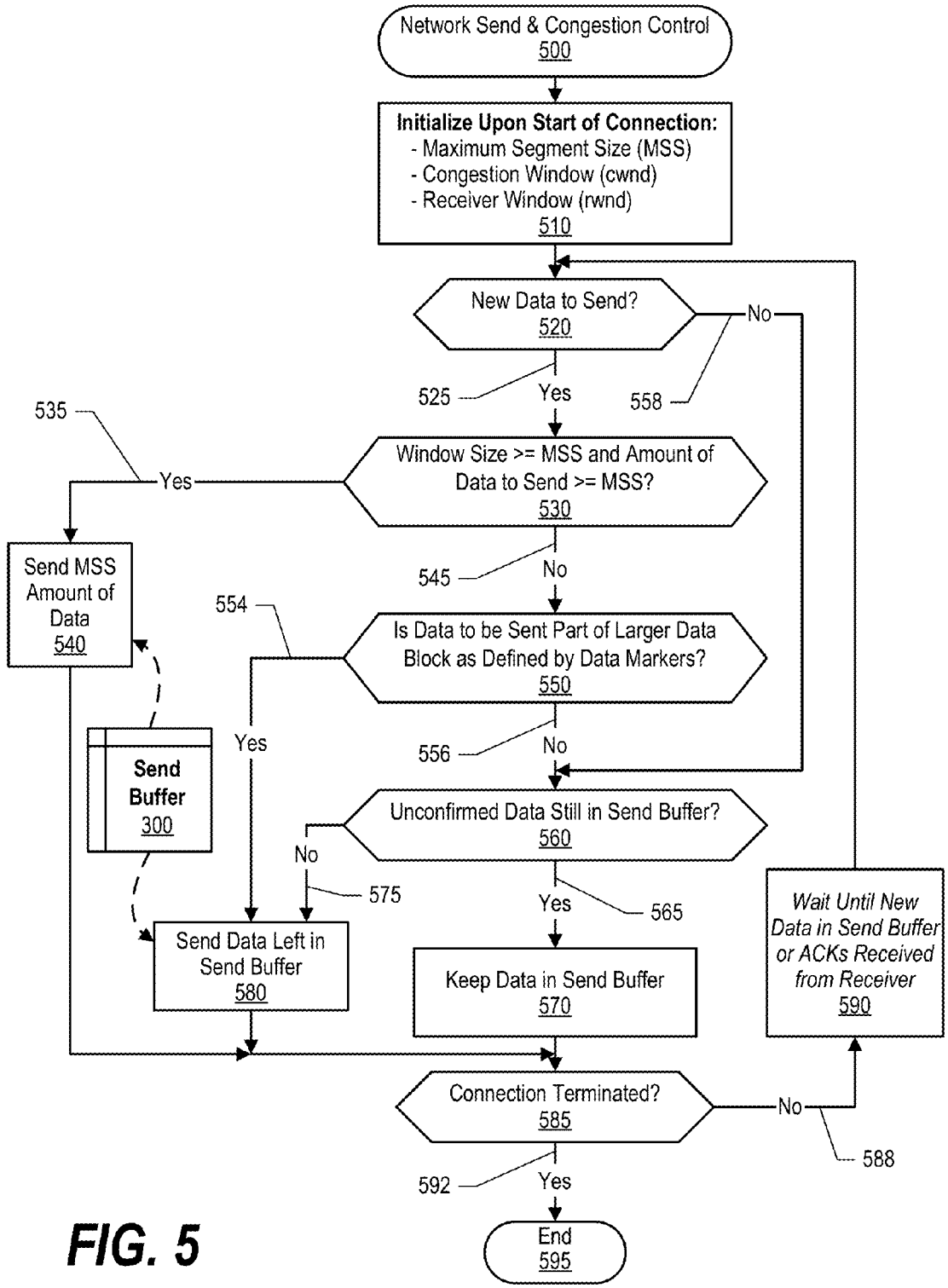
FIG. 5 is a flowchart showing the network send process that controls network congestion and uses the data markers included in the send buffer to send data blocks without waiting for acknowledgements from the receiver.

FIG. 4 is a flowchart data being written to the send buffer and markers being inserted before and after the blocks of data written to the send buffer. The process used to write data blocks to send buffer 300 is shown commencing at 400 whereupon, at step 410, the process receives a request from software application 415 to write data over a computer network using an established network connection. Send buffer 300 is a first-in-first-out (FIFO) buffer. At step 420, the beginning of the data block is identified. In one embodiment, the beginning of the data block is identified by writing a particular marker to send buffer 300 that identifies the following data as being a data block. At step 430, the process writes the data requested by the software application to be sent to the receiver. This data is written to send buffer 300 following the beginning data marker. At step 440, the ending of the data block is identified. In one embodiment, the ending of the data block is identified by writing another Marker to send buffer 300 that identifies, or marks, the end of the data block. As shown by the example send buffer shown in FIG. 3, multiple data blocks are bounded by pairs of data markers. While both a beginning and ending data marker are shown for clarity, a single data marker could be used to signify both the end of one data block and the beginning of the next data block. At step 450, the process waits for the next send request to be received from software application 415. When the next request is received, processing loops back to receive the requested data and perform the steps outlined above. This looping continues while the connection between the sender and receiver is maintained. FIG. 5 describes the process that is performed to actually send the data stored in send buffer 300 to the receiver.

FIG. 5 is a flowchart showing the network send process that controls network congestion and uses the data markers included in the send buffer to send data blocks without waiting for acknowledgements from the receiver. Network send and congestion control process commences at 500 whereupon, at step 510, the process initializes settings that are initialized when the connection between the sender and receiver is initially opened and generally used during the duration of the connection. These settings include the determined send segment size (e.g., Maximum Segment Size (MSS)), the congestion window size, and the receiver window. The determined send segment size (MSS) is the maximum size of segments that are sent between the sender and the receiver over the connection. The congestion window is the number of outstanding acknowledgements that are allowed during the connection, and the receiver window is the amount of buffer space left at the receiver which is based on the receivers receive buffer.

A determination is made as to whether there is new data to send in send buffer 300 (decision 520). If there is new data to send, then decision 520 branches to "yes" branch 525 whereupon a determination is made as to whether the receiver's window size is large enough (greater than or equal to the determined send segment size) and whether the amount of data in the send buffer is greater than or equal to the determined send segment size. If these two conditions are met, decision 530 branches to "yes" branch 535 whereupon, at step 540, the process sends a data segment from send buffer to the receiver with the size of the data segment being equal to the determined send segment size (e.g., in FIG. 3, the size of these segments was 1460 bytes). Step 540 is performed so long as the congestion window size is satisfied.

On the other hand, if either the receivers window is not large enough (e.g., the receiver is still processing the receivers buffer) or the amount of data in send buffer 300 is smaller than the determined send segment size (smaller than the MSS), then decision 530 branches to "no" branch 545 whereupon a determination is made as to whether, in the case where the amount of data in the send buffer is smaller than the determined send segment size, data in the send buffer is identified as a portion of a larger data block (decision 550). One of the ways this determination can be made is by reading data markers inserted in the send buffer by the process shown in FIG. 4. If the data is a portion of a larger data block where the other segment(s) of the larger data block have already been sent, then decision 550 bys to "yes" branch 554 whereupon, at step 580, the data remaining in the send buffer is sent to the receiver (e.g., in FIG. 3, the remaining 1 byte of data would be the data sent at step 390).

On the other hand, if the amount of data in the send buffer is not greater than or equal to the determined send segment size and the data remaining in the send buffer is not a portion of a larger data block where portions have already been sent, then decision 550 branches to "no" branch 556 and a determination is made as to whether there is any unconfirmed data (decision 560). If there is unconfirmed data (not all acknowledgements have been received from the receiver), then decision 560 branches to "yes" branch 565 whereupon, at step 570 the data is kept in the send buffer. On the other hand, if all outstanding acknowledgements have been received from the receiver, then decision 560 branches to "no" branch 575 whereupon, at step 580, the data remaining in the send buffer is sent to the receiver.

A determination is made as to whether the connection between the sender and the receiver has been terminated (decision 585). So long as the connection remains open, decision 585 branches to "no" branch 588 whereupon, at step 590, the process waits until all outstanding acknowledgements have been received from the receiver or new data has been received in the send buffer. When either of these events occur, processing loops back to decision 520 to continue processing the send buffer. This processing of the send buffer continues until the connection between the sender and the receiver is terminated, at which point decision 585 branches to "yes" branch 592 and processing ends at 595.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in, a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A processor-implemented method comprising:
receiving a request at a sender to send a data block to a receiver over a computer network;
writing the data block by the sender to a send buffer in response to receiving the request;
writing, by the sender, a pair of data markers in the send buffer, wherein the first of the pair of data markers marks a beginning of the data block and the second of the pair of data markers marks an end of the data block;
determining that the data block includes a plurality of data segments corresponding to a send segment size, each of the plurality of data segments identified as being a portion of the data block;
sending, by the sender via the computer network, all but a remaining data segment of the plurality of data segments to the receiver, wherein the sent data segments are each the send segment size, and wherein the remaining data segment is smaller than the send segment size;
reading, by the sender, the second of the pair of data markers;
determining, by the sender, that the remaining data segment is one of the portions of the data block in response to the sender reading the second of the pair of data markers, wherein the determination by the sender is performed independent of the receiver; and
sending, by the sender via the computer network, the remaining data segment to the receiver in response to the determination that the remaining data segment is one of the portions of the data block.

2. The method of claim 1 wherein the send segment size is a maximum segment size (MSS).

3. The method of claim 1 further comprising:
identifying a subsequent data block in the send buffer wherein the subsequent data block includes a single data segment to send to the receiver over the computer network; and
forming a combined data packet that includes the single data segment and the remaining data segment, wherein the size of the combined data packet is less than the determined send segment size, and wherein the sending of the remaining data segment includes sending the combined data packet that includes the remaining data segment.

4. The method of claim 1 further comprising:
after the sending of the remaining data segment:
receiving a second data block, wherein the second data block is written to the send buffer;
writing a second pair of data markers in the send buffer, wherein the first of the second pair of data markers marks a beginning of the second data block and wherein the second of the second pair of data markers marks an end of the second data block;
delaying the sending of the second data block in response to the second data block being smaller than the determined send segment size and in response to not receiving one or more outstanding acknowledgments from the receiver; and sending the second data block to the receiver in response to the second data block being larger than the determined send segment size or in response to all of the outstanding acknowledgements being received from the receiver.

5. The method of claim 4 further comprises:

receiving a third data block, wherein the third data block is written to the send buffer;

writing a third pair of data markers in the send buffer, wherein the first of the third pair of data markers marks a beginning of the third data block and wherein the second of the third pair of data markers marks an end of the third data block; and sending the second data block and one or more additional segments of the third data block to the receiver in response to the combined second data block and the third data block being larger than the determined send segment size.

6. The method of claim 4 further comprising:

receiving all outstanding acknowledgements from the receiver after the delaying of the sending of the second data block; and sending the second data block to the receiver in response to the receiving of all outstanding acknowledgements.

7. An information handling system comprising:

one or more processors;

a memory coupled to at least one of the processors;

a nonvolatile storage area coupled to at least one of the processors;

a network adapter that connects the information handling system to a computer network; and a set of instructions stored in the memory and executed by at least one of the processors in order to perform actions of:

receiving a request at the information handling system to send a data block to a receiver over a computer network;

writing the data block by the information handling system to a send buffer in response to receiving the request;

writing, by the information handling system, a pair of data markers in the send buffer, wherein the first of the pair of data markers marks a beginning of the data block and the second of the pair of data markers marks an end of the data block;

determining that the data block includes a plurality of data segments corresponding to a send segment size, each of the plurality of data segments identified as being a portion of the data block;

sending, by the information handling system via the computer network, all but a remaining data segment of the plurality of data segments to the receiver, wherein the sent data segments are each the send segment size, and wherein the remaining data segment is smaller than the send segment size;

reading, by the sender, the second of the pair of data markers;

determining, by the information handling system, that the remaining data segment is one of the portions of the data block in response to the sender reading the second of the pair of data markers, wherein the determination by the information handling system is performed independent of the receiver; and sending, by the information handling system via the computer network, the remaining data segment to the receiver in response to the determination that the remaining data segment is one of the portions of the data block.

8. The information handling system of claim 7 wherein the send segment size is a maximum segment size (MSS).

9. The information handling system of claim 7 further comprising additional actions of:

identifying a subsequent data block in the send buffer wherein the subsequent data block includes a single data segment to send to the receiver over the computer network; and forming a combined data packet that includes the single data segment and the remaining data segment, wherein the size of the combined data packet is less than the determined send segment size, and wherein the sending of the remaining data segment includes sending the combined data packet that includes the remaining data segment.

10. The information handling system of claim 7 further comprising additional actions of:

after the sending of the remaining data segment:

receiving a second data block, wherein the second data block is written to the send buffer;

writing a second pair of data markers in the send buffer, wherein the first of the second pair of data markers marks a beginning of the second data block and wherein the second of the second pair of data markers marks an end of the second data block;

delaying the sending of the second data block in response to the second data block being smaller than the determined send segment size and in response to not receiving one or more outstanding acknowledgments from the receiver; and sending the second data block to the receiver in response to the second data block being larger than the determined send segment size or in response to all of the outstanding acknowledgements being received from the receiver.

11. The information handling system of claim 10 further comprising additional actions of:

receiving a third data block, wherein the third data block is written to the send buffer;

writing a third pair of data markers in the send buffer, wherein the first of the third pair of data markers marks a beginning of the third data block and wherein the second of the third pair of data markers marks an end of the third data block; and sending the second data block and one or more additional segments of the third data block to the receiver in response to the combined second data block and the third data block being larger than the determined send segment size.

12. A computer program product stored in a non-transitory computer storage medium, comprising functional descriptive material that, when executed by an information handling system, causes the information handling system to perform actions that include:

receiving a request at the information handling system to send a data block to a receiver over a computer network;

writing the data block by the information handling system to a send buffer in response to receiving the request;

writing, by the information handling system, a pair of data markers in the send buffer, wherein the first of the pair of data markers marks a beginning of the data block and the second of the pair of data markers marks an end of the data block;

determining that the data block includes a plurality of data segments corresponding to a send segment size, each of the plurality of data segments identified as being a portion of the data block;

sending, by the information handling system via the computer network, all but a remaining data segment of the plurality of data segments to the receiver, wherein the sent data segments are each the send segment size, and wherein the remaining data segment is smaller than the send segment size;

reading, by the sender, the second of the pair of data markers;

determining, by the information handling system, that the remaining data segment is one of the portions of the data block in response to the sender reading the second of the pair of data markers, wherein the determination by the information handling system is performed independent of the receiver; and sending, by the information handling system via the computer network, the remaining data segment to the receiver in response to the determination that the remaining data segment is one of the portions of the data block.

13. The computer program product of claim 12 wherein the send segment size is a maximum segment size (MSS).

14. The computer program product of claim 13 further comprising additional actions of:

identifying a subsequent data block in the send buffer wherein the subsequent data block includes a single data segment to send to the receiver over the computer network; and forming a combined data packet that includes the single data segment and the remaining data segment, wherein the size of the combined data packet is less than the determined send segment size, and wherein the sending of the remaining data segment includes sending the combined data packet that includes the remaining data segment.

15. The computer program product of claim 12 further comprising additional actions of:

after the sending of the remaining data segment:

receiving a second data block, wherein the second data block is written to the send buffer;

writing a second pair of data markers in the send buffer, wherein the first of the second pair of data markers marks a beginning of the second data block and wherein the second of the second pair of data markers marks an end of the second data block;

delaying the sending of the second data block in response to the second data block being smaller than the determined send segment size and in response to not receiving one or more outstanding acknowledgments from the receiver; and sending the second data block to the receiver in response to the second data block being larger than the determined send segment size or in response to all of the outstanding acknowledgements being received from the receiver.

16. The computer program product of claim 12 further comprising additional actions of:

receiving a third data block, wherein the third data block is written to the send buffer;

writing a third pair of data markers in the send buffer, wherein the first of the third pair of data markers marks a beginning of the third data block and wherein the second of the third pair of data markers marks an end of the third data block; and sending the second data block and one or more additional segments of the third data block to the receiver in response to the combined second data block and the third data block being larger than the determined send segment size.

17. The computer program product of claim 16 further comprising additional actions of:

receiving all outstanding acknowledgements from the receiver after the delaying of the sending of the second data block; and sending the second data block to the receiver in response to the receiving of all outstanding acknowledgements.

* * * * *